(12) United States Patent
Tsai et al.

(10) Patent No.: US 7,189,173 B2
(45) Date of Patent: Mar. 13, 2007

(54) FRONT DERAILLEUR FOR A BICYCLE

(75) Inventors: Ming-Chih Tsai, LuJu (TW); Yan-Long Sheng, LuJu (TW)

(73) Assignee: SunRace Sturmey-Archer Inc., TaoYuan County (TW)

( * ) Notice: Subject to any disclaimer, the term of this patent is extended or adjusted under 35 U.S.C. 154(b) by 57 days.

(21) Appl. No.: 10/612,924

(22) Filed: Jul. 7, 2003

(65) Prior Publication Data
US 2004/0005951 A1    Jan. 8, 2004

(51) Int. Cl.
*F16H 9/00* (2006.01)
(52) U.S. Cl. .......................................... 474/82
(58) Field of Classification Search .................. 474/69, 474/78, 80, 82, 83
See application file for complete search history.

(56) References Cited

U.S. PATENT DOCUMENTS 4,330,137 A * 5/1982 Nagano ...................... 280/238
5,620,384 A * 4/1997 Kojima et al. ................ 474/82
5,624,336 A * 4/1997 Kojima ......................... 474/82
5,779,580 A * 7/1998 White et al. ................... 474/80
6,695,729 B2 * 2/2004 Ozaki ............................ 474/80

* cited by examiner

*Primary Examiner*—Vicky A. Johnson
(74) *Attorney, Agent, or Firm*—Troxell Law Office PLLC

(57) ABSTRACT

The present invention provides a bicycle front derailleur mountable to a seat tube of a bicycle frame for fitting a chain around a selected sprocket of a multiple chainwheel by pushing the chain laterally at a portion thereof advancing into engagement with the chainwheel, the front derailleur comprising: a fixed section fixed to a bicycle frame, a chain guide for contacting a chain to shift the chain, and an actuating arm and a linkage rod disposed between and pivotally connected to the fixed section and the chain guide. In the above construction, the present invention has achieved the intended object of providing an improved bicycle front derailleur capable of reliably effecting a change speed operation with the aid of a sufficient restoring force of the return spring and achieving minimized in operation forces required for various change speeds.

8 Claims, 14 Drawing Sheets

FRONT DERAILLEUR FOR A BICYCLE

BACKGROUND OF THE INVENTION (a). Field of the Invention

The present invention relates to a front derailleur for a bicycle, and more specifically to a front derailleur for a bicycle that can achieve efficiency and stability during a shifting operation.

(b). Description of the Prior Arts

A bicycle is commonly used as a transportation vehicle; and widely employed as a sport machine. Basically, the bicycle includes several parts, such as transmission system, brake system, frame, and so on, although these parts vary from different types of bicycles. The frame constructs the main body of a bicycle. The transmission system which is a mechanism in combination of chain, chainwheel, freewheel, pedal, and soon, plays a role to transmit a force generated from cyclist to drive the bicycle. In the derailleur system for a bicycle A, as shown in FIG. 1, which includes a seat tube A1, a chainwheel B1, a freewheel B2, a chain C, a front derailleur D1, a rear derailleur D2, a rocking arm D3, a wire (not shown), and a shift lever (not shown), the chain C can be shifted among sprockets B11 of the chainwheel B1 and sprockets B21 of the freewheel B2 by the front derailleur D1 and rear derailleur D2 in response to force generated by cyclist or return spring of derailleur system. Since the sprockets of the chainwheel B1 and the freewheel B2 have different teeth, the cyclist may adjust the chain through the front derailleur and the rear derailleur to obtain a gear ratio between the sprockets of the chainwheel B1 and the freewheel B2, so as to ride the bicycle A in a time-saving or labor-saving mode. Therefore, the derailleur system is a vital factor for the performance of bicycle.

Front derailleurs for bicycles are well known in the art. Illustrative are the front derailleurs disclosed in U.S. Pat. Nos. 5,496,222 and 5,620,384. The typical front derailleur includes a fixed bicycle frame member, a chain guide having an outer guide plate and an inner guide plate which are disposed at opposite sides of the chain C, and linkage members comprising an actuating arm and a linkage rod. The linkage members are connected to the fixed bicycle frame member and the chain guide through pivot pins extending perpendicularly to the axis of the multistage front sprockets to thereby form a parallelogram linkage mechanism which allows the chain guide to move axially of the front sprockets.

The parallelogram linkage mechanism usually is provided with a return spring which biases the chain guide toward the bicycle frame, that is, from the larger diameter front sprocket to the smaller diameter sprocket. In operation, when a cyclist pivots the shift lever to pull the control cable against the return spring to actuate the linkage mechanism which moves the chain guide axially of the multistage front sprockets, thereby shifting the chain from a smaller diameter sprocket to a larger diameter sprocket. To shift the chain from the larger diameter sprocket to a smaller diameter, the control cable is loosened and the restoring force of the return spring moves the chain accordingly.

The chain guide of the linkage mechanism, as disclosed in U.S. Pat. Nos. 5,496,222 and 5,620,384, is operable through a pivoting range between the larger wheel side tilt position and the small wheel side tilt position. The imaginary vertical line V accordingly is located within the pivoting range, as shown in FIG. 4, where the return spring applies a turning force PL to the chain guide when the chain guide is in the low speed position. An operating force FL is needed to cause the chain guide to pivot from the low speed position against the return spring. When the chain guide pivots through the tilt angle A to the vertically extending intermediate position, the chain guide receives a turning force P from the return spring. An operating force F is needed to cause the chain guide to pivot from the intermediate position against the return spring. When the chain guide pivots from the intermediate position through the tilt angle B to the high speed position, the chain guide receives a turning force PT from the return spring. An operating force FT is needed to cause the chain guide to pivot to the high speed position against the return spring. Further, in FIG. 4, because the return spring undergoes a varying elastic deformation with the pivotal movement of the chain guide, the turning force P in the intermediate position becomes greater than the turning force. PL in the low speed position, and the turning force PT in the high position becomes greater than the turning force P in the intermediate position. It will become clear from FIG. 4 that FL=PL/cos E, FT=PT/cos G and angle E equals angle A, angle G equals angle B.

The aforementioned linkage mechanism moves from the left of the imaginary line V to its right. Thus, while in high spend mode (that is, the chain engages the larger chainwheel sprocket and the smaller freewheel sprocket that a greater ratio will result to enable one to ride the bicycle at high speed), the loading of the chain is at its maximum so that the flexibility of the chain thereby is very low, and also the linkage rod is not at a near perpendicular state to be able to utilize the restoring force of the return spring filly. Besides, the inter-pivot distance Lh (as seen in FIG. 5) for the outer guide plate to act on the chain is very short. Consequently, a larger operating force is needed to translate the chain laterally of the bicycle for enabling the speed change. On the other hand, the inter-pivot distance Lm is longer than Lh during the change of speed from middle to low. For that reason, the down-shifting efficiency of the prior art in high speed mode (translating the chain from the larger sprocket to the smaller sprocket) is not preferable. To improve the down-shifting efficiency in high speed mode, the return spring will need to be strengthen and in consequence cause the cyclist more strength to operate while up-shifting.

In view of the above, there exists a need for a bicycle front derailleur which overcomes the above mention problems in the prior art. The present invention addresses this need in the prior art as well as other needs, which will become apparent to those skilled in the art from this disclosure.

SUMMARY OF THE INVENTION

Accordingly, an object of the present invention is to overcome all the forgoing problems of the prior art. To fulfill the above object, the present invention provides a bicycle front derailleur mountable to a seat tube of a bicycle frame for fitting a chain around a selected sprocket of a multiple chainwheel by pushing the chain laterally at a portion thereof advancing into engagement with the chainwheel, the front derailleur comprising: a fixed section fixed to a bicycle frame, a chain guide for contacting a chain to shift the chain, and an actuating arm and a linkage rod disposed between and pivotally connected to the fixed section and the chain guide.

The fixed section, the chain guide, and a movable section including the actuating arm and the linkage rod constitute a simple four-bar linkage mechanism, in which the actuating arm is driven by a tension transmitting through a control cable. When the cyclist push a shift lever, a tension transmitting through the control cable would drive the actuating arm to push the chain guide outwardly among the chainwheel sprockets, therefore, shifting the chain thereon. However, because the control cable could only transmit tension, the front derailleur must implant a return spring to provide a return force for pulling the chain guide inwardly, while the tension released.

In the above construction, the present invention has achieved the intended object of providing an improved bicycle front derailleur capable of reliably effecting a change speed operation with the aid of a sufficient restoring force of the return spring and achieving minimized in operation forces required for various change speeds.

The object of the present invention is by employing the linkage mechanism comprising the frame bracket 1, the chain guide 3, the linkage rod 4 and the actuating arm 2 positioned in such a manner that, while said chain guide of the front derailleur is operating in the highest speed mode, said linkage rod is at a position substantially parallel to said seat tube, so that a restoring force provided by said return spring is equal to an active component force for actually shifting said chain, that is, the restoring force can be utilized fully for down-shifting.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE PRESENT INVENTION

The following embodiments will illustrate the front derailleur for a bicycle of the present invention in detail.

Figure 1:
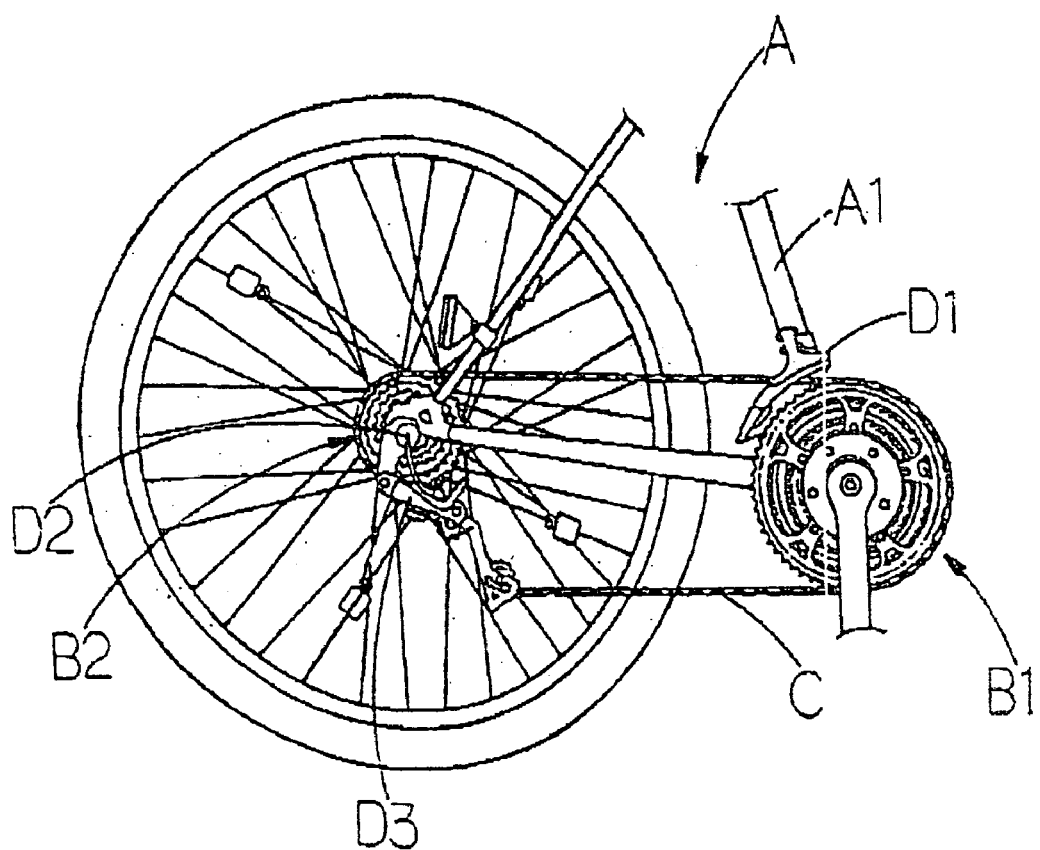
FIG. 1 is a diagrammatic side view of a bicycle provided with a derailleur system of the prior art.
Figure 2:
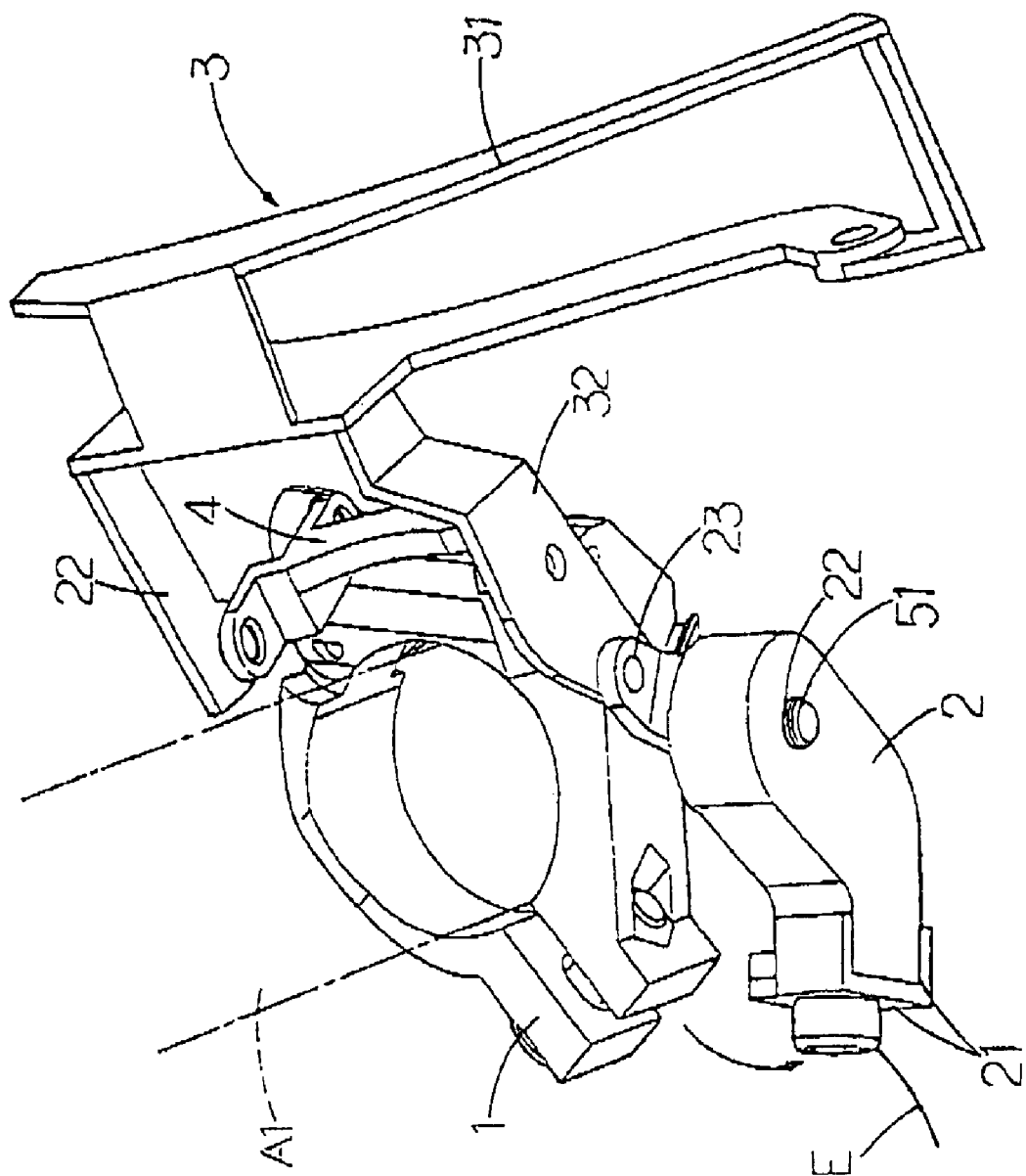
FIG. 2 is an overall perspective view showing a front derailleur at the largest gear according to the present invention.
Figure 3:
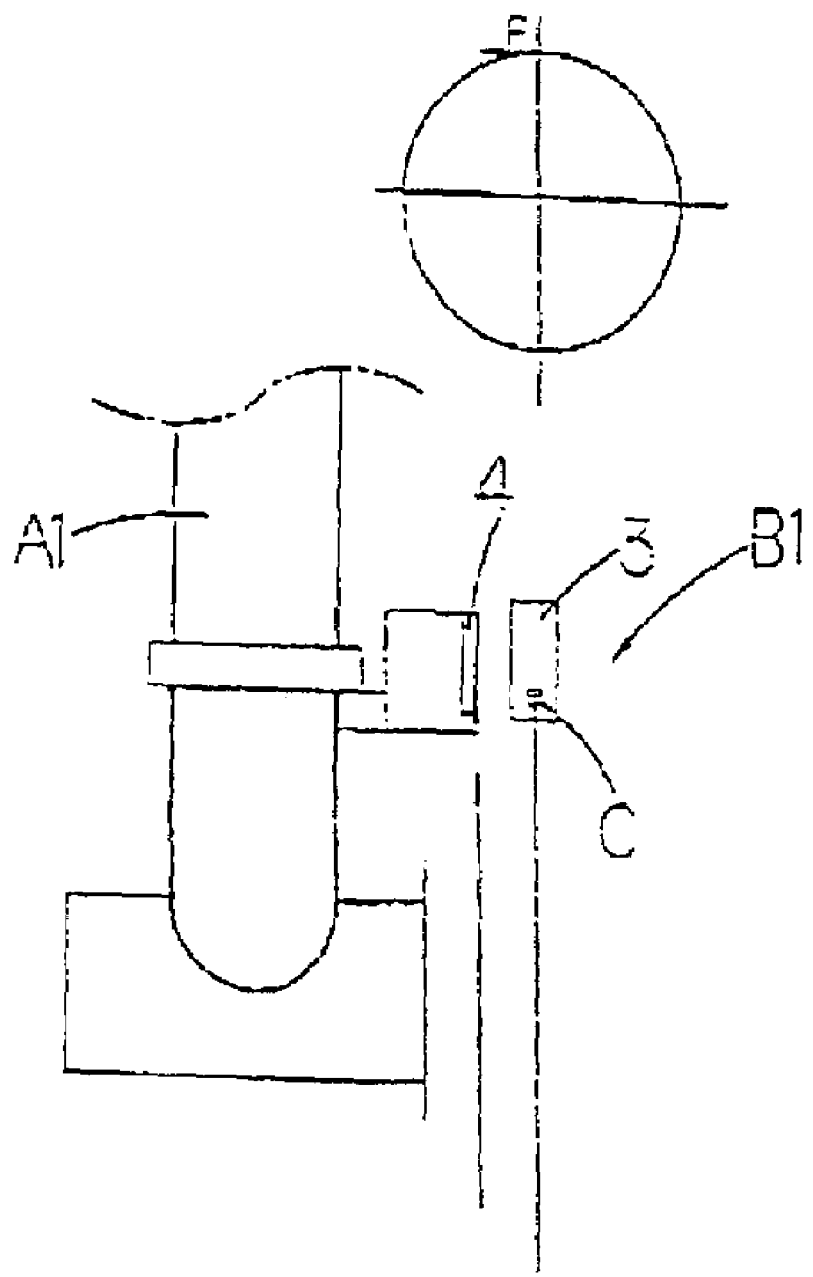
FIG. 3 is a diagrammatic side view drawing of a front derailleur at the largest gear according to the present invention.
Figure 4:
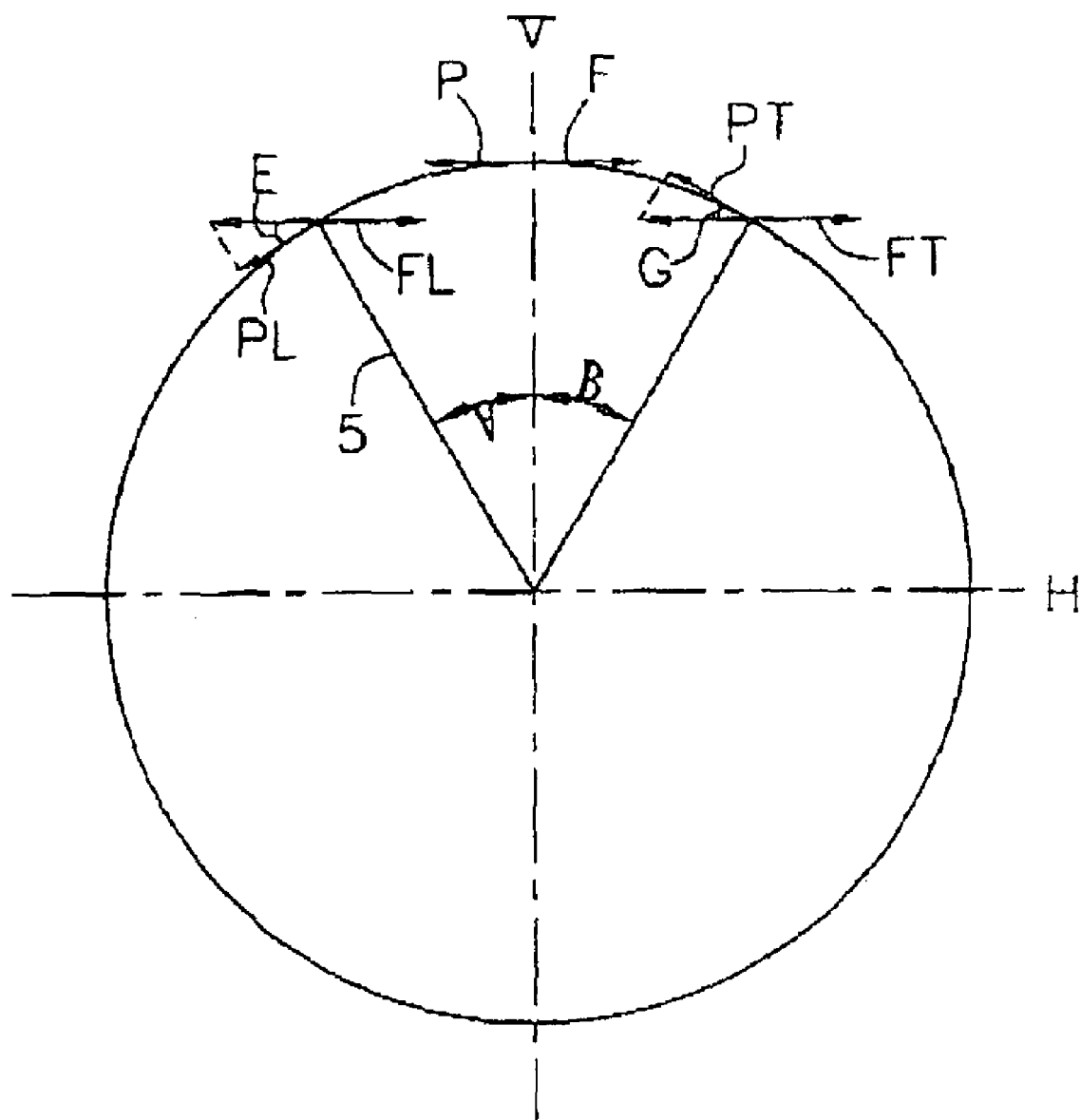
FIG. 4 is a view showing a torque applied to a chain guide of a front derailleur according to the prior art.
Figure 5:
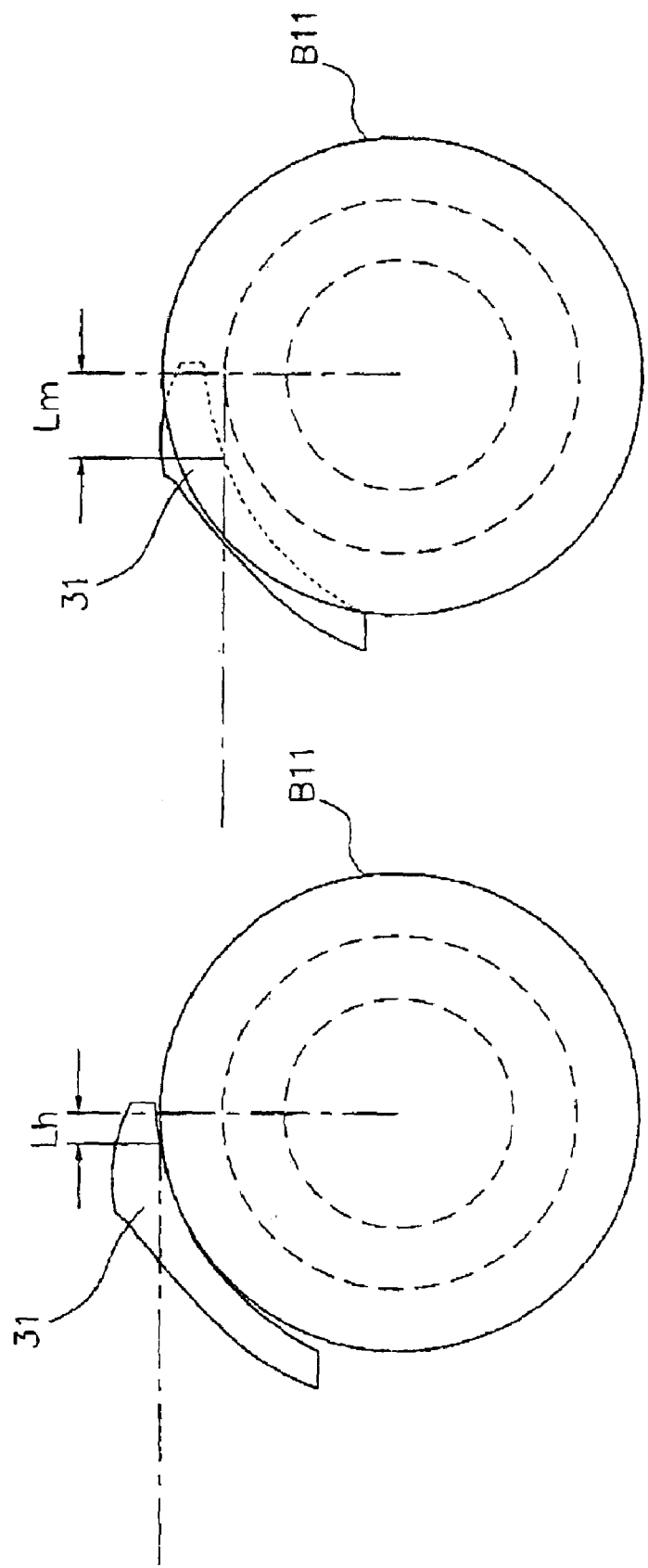
FIG. 5 is a diagrammatic side view drawing of a front derailleur schematically showing the inter-pivot distance according to the prior art.
Figure 6:
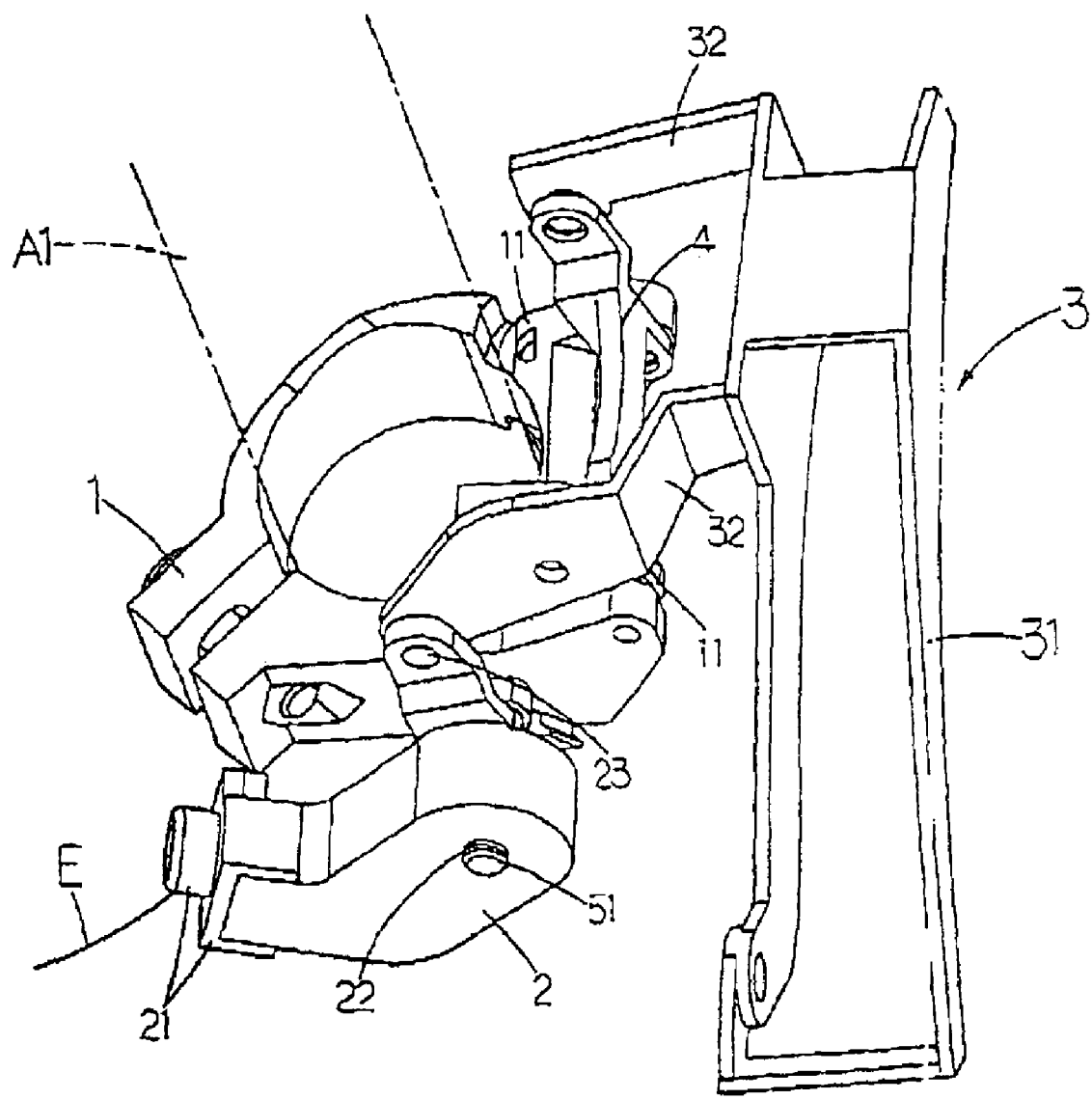
FIG. 6 is an overall perspective view showing an embodiment of the present invention.
Figure 7:
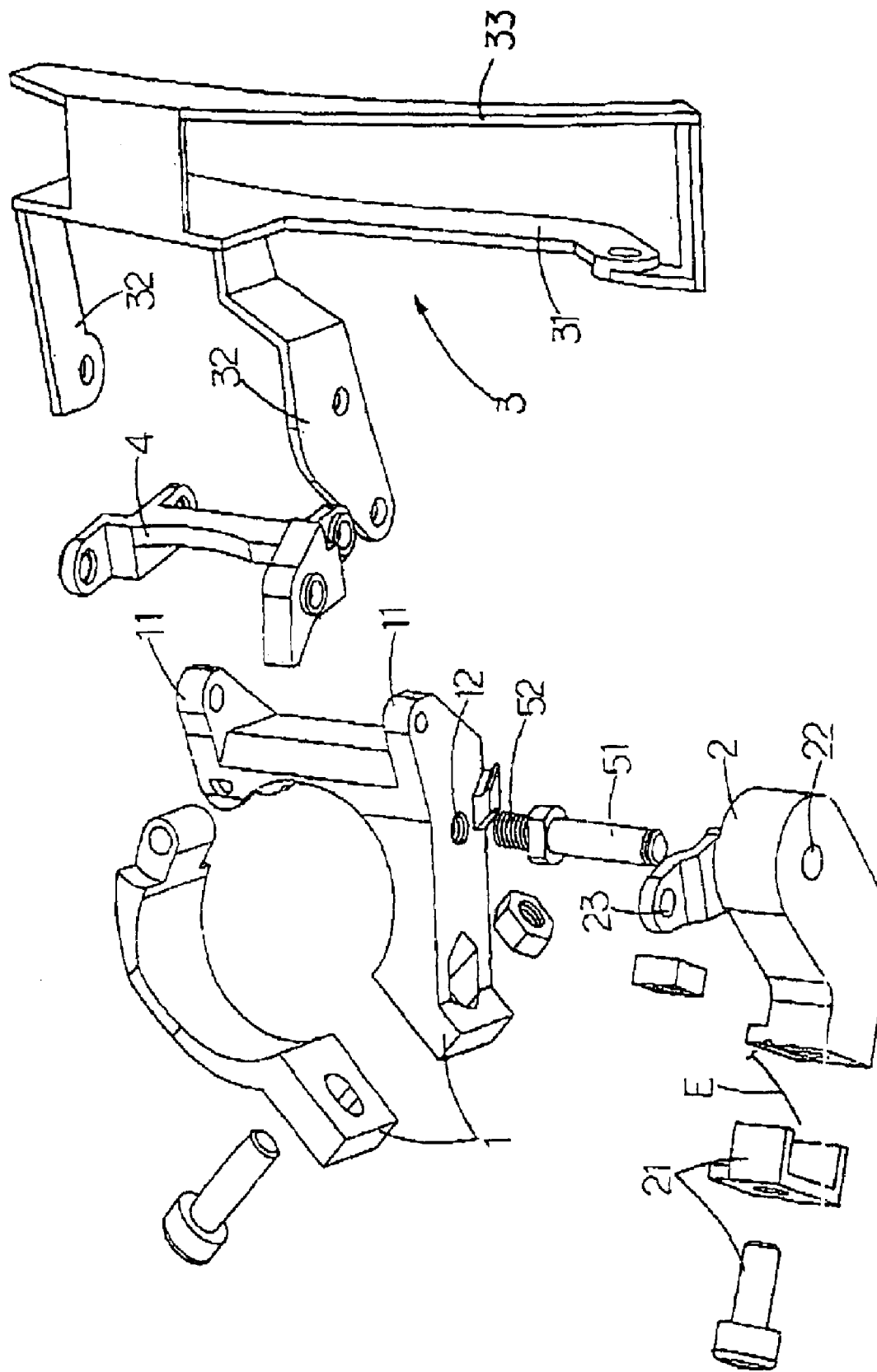
FIG. 7 is a detailed drawing showing an embodiment of the present invention.

With reference to FIG. 6 and FIG. 7, a preferred embodiment of the present invention is presented illustrating a bicycle front derailleur comprises: a frame bracket 1 having a pair of lugs 11 disposed at the side thereof close to the chainwheel B1 for connecting with the seat tube A1; a chain guide 3 comprising a guide plate 31 overstriding the chain C and a pivot joint 32 formed at the opposite side of the guide plate 31; a linkage rod 4 having one of its end pivotally connected to the lug 11, and the other end pivotally connected to the pivot joint 32; an actuating arm 2 is pivotally connected to the frame bracket 1 through two shaft hole 12, 22, which are located respectively at one side of the lug 11 of the frame bracket 1 and at middle section of the actuating arm 2, using a shaft 51 installed with a return spring 52, furthermore, the actuating arm 2 comprises a pivot joint plate 23 formed at one of its end for pivotally connecting to the pivot joint 32 of the chain guide 3, and a cable connector 21 installed on the other end thereof which is composed of cover plate and screw for connecting to a control cable (not shown).

With reference to FIG. 6, the object of the present invention is by employing the linkage mechanism comprising the frame bracket 1, the chain guide 3, the linkage rod 4 and the actuating arm 2 positioned in such a manner that, while said chain guide of the front derailleur is operating in the highest speed mode, said linkage rod is at a position substantially parallel to said seat tube, so that a restoring force provided by said return spring is equal to an active component force for actually shifting said chain, that is, the restoring force can be utilized fully for down-shifting.

Figure 8:
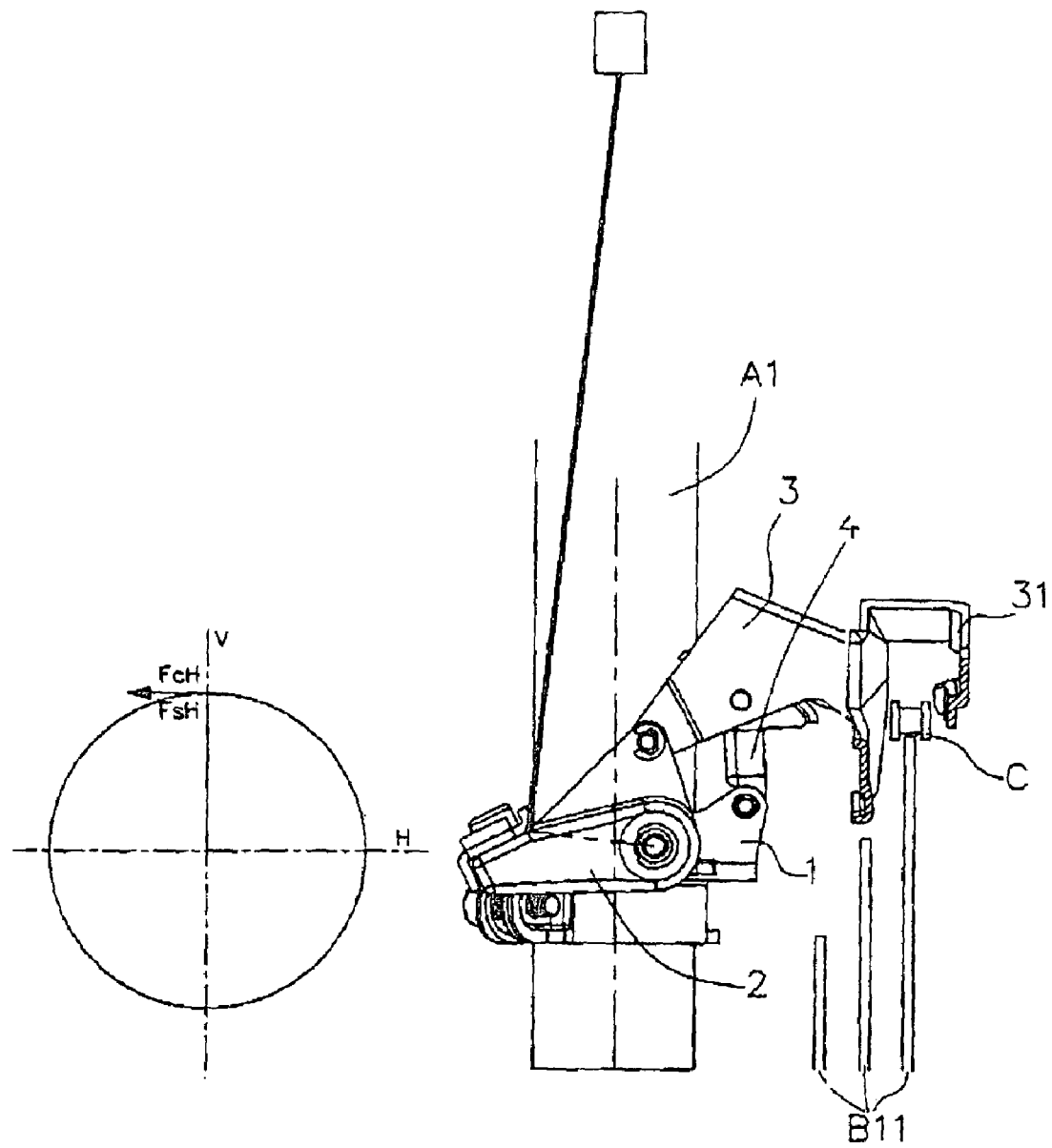
FIG. 8 is a front view drawing showing an embodiment of the present invention in the high speed mode and a view showing a torque applied to a chain guide in the high speed mode according to the present invention.
Figure 9:
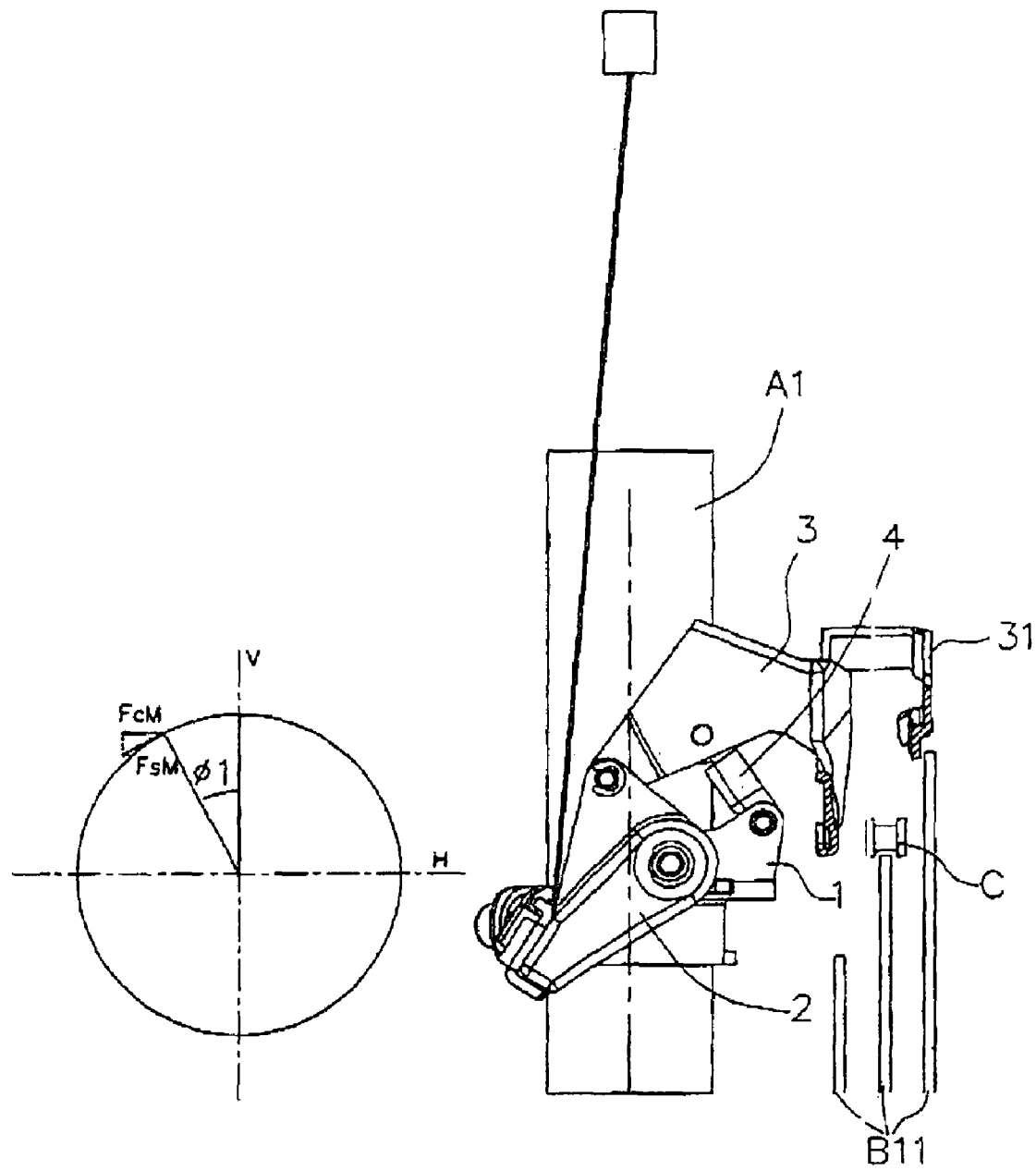
FIG. 9 is a front view drawing showing an embodiment of the present invention in the intermediate speed mode and a view showing a torque applied to a chain guide in the intermediate mode according to the present invention.
Figure 10:
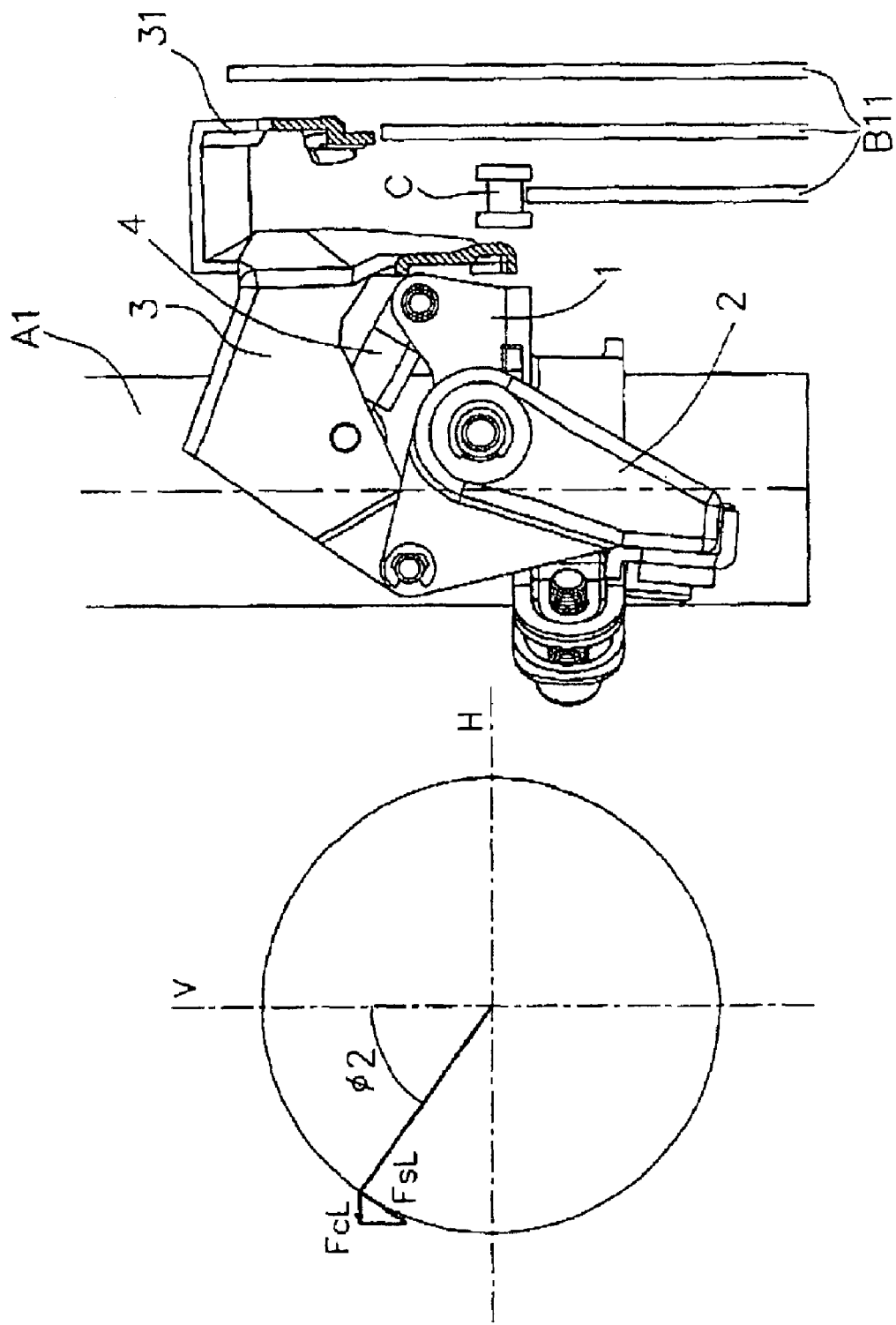
FIG. 10 is a front view drawing showing an embodiment of the present invention in the low speed mode and a view showing a torque applied to a chain guide in the low mode according to the present invention.

In the present embodiment, as shown in FIG. 8, the chain guide 3 of the linkage mechanism is operating in high speed mode and the linkage rod 4 is at a position parallel to the seat tube A1. Therefore, the imaginary vertical line V is located at an end of pivoting rang that the restoring force FsH of the return spring 52 is equal to the active component force FcH for actually shifting the chain C that is, the restoring force can be utilized fully for down-shifting. When the chain guide pivots from the high speed position through an angle $\phi_1$ to an intermediate position, as shown in FIG. 9, the chain guide 3 receives a restoring force FsM from the return spring that only the active component force FcM thereby can be actually utilized for down-shifting. When the chain guide pivots from the intermediate speed position through an angle ($\phi_2-\phi_1$) to an low position, as shown in FIG. 10, the chain guide 3 receives a restoring force FsL from the return spring that only the active component force FcL thereby can be actually utilized for down-shifting. Further, in FIG. 11, because the return spring undergoes a varying elastic deformation with the pivotal movement of the chain guide, the restoring force FsM in the intermediate position becomes greater than the restoring force FsL in the low speed position, and the restoring force FsH in the high position becomes greater than the restoring force FsM in the intermediate position. It becomes clear from FIG. 11 that FcH=FsH, FcM=FsM* cos $\phi_1$, and FcL=FsL* cos $\phi_2$.

Figures 11, 12:
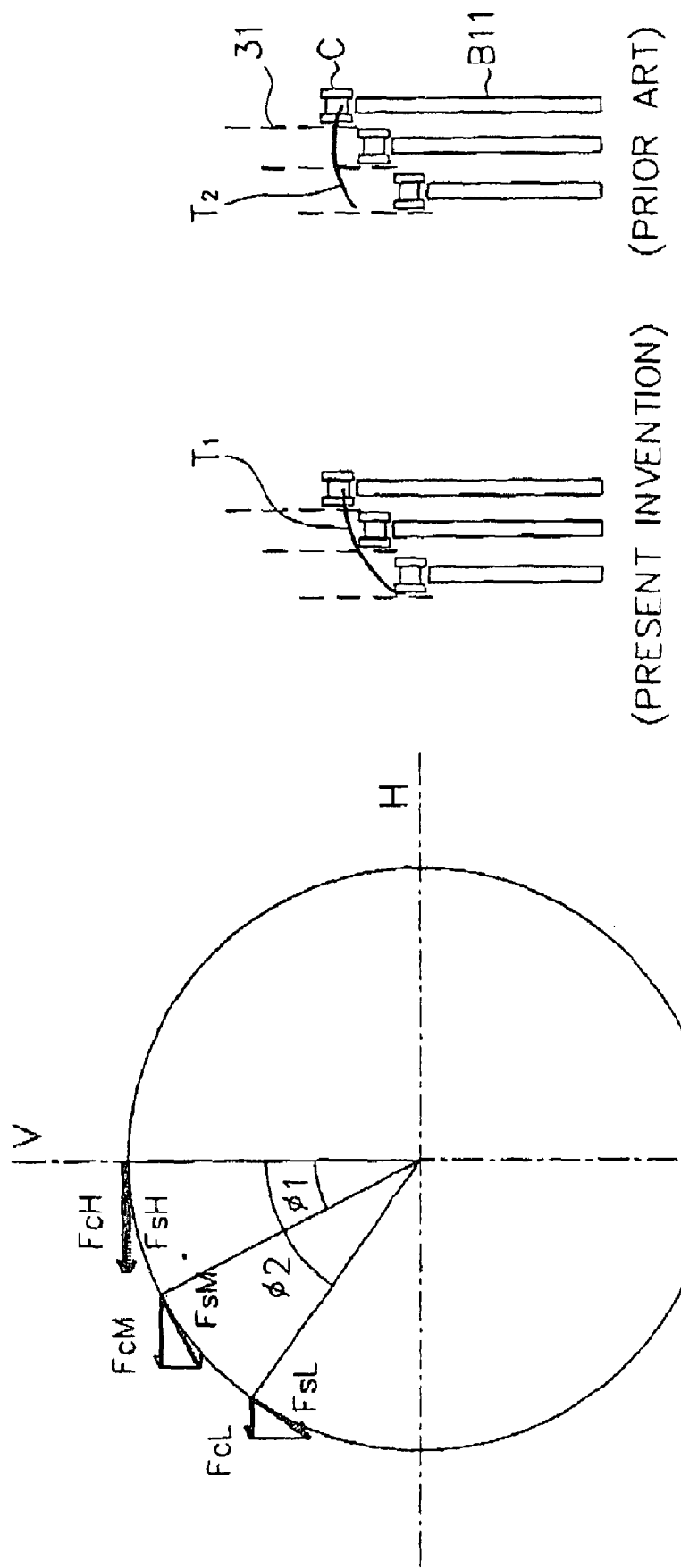
FIG. 11 is a view showing a torque applied to a chain guide of a front derailleur according to the present invention.
FIG. 12 is a schematic drawing showing the comparison of a moving track of the chain guide between the present invention and the prior art.

Moreover, the moving track T2 of the chain guide 3 according to the present invention is an upward continuous arc. Comparing to the moving track T1 of the prior art, as seen in FIG. 12, the track T2 enables the chain guide 3 to be more adjacent to the larger sprocket of to the chainwheel B1. Besides, the return spring having less strength can be used in the present invention since the restoring force is utilized fully for down-shifting in high speed mode comaring to the prior art so that less force will be needed for up-shifting. Consequently, the up-shifting efficiency can be improved.

Figure 13:
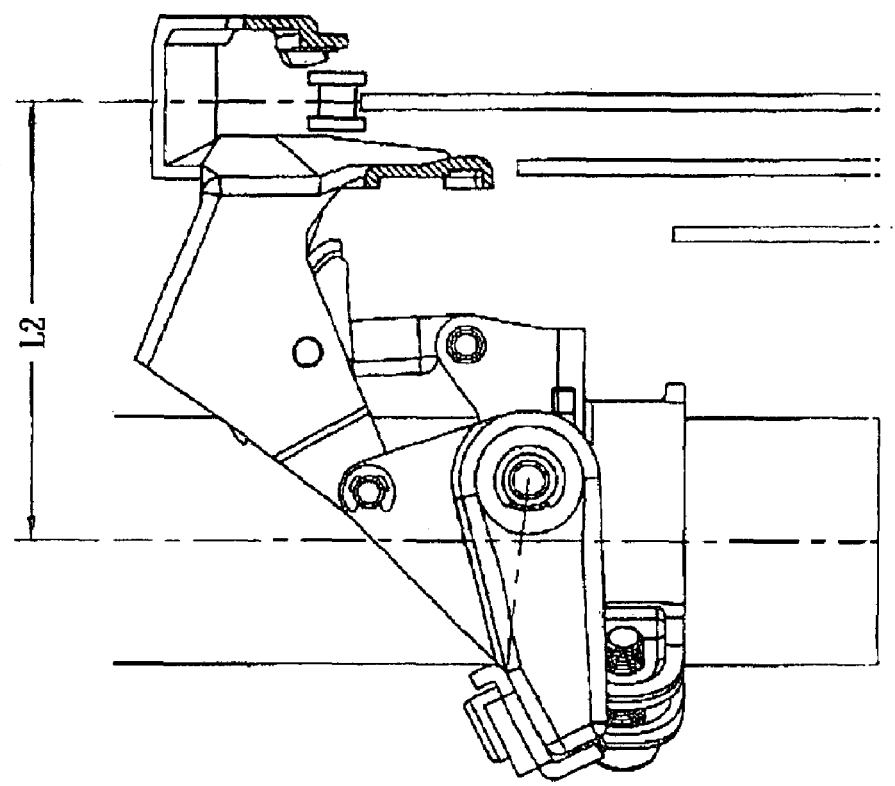
FIG. 13 is a schematic drawing showing the comparison of a working position of the chain guide between the high speed mode and the low speed mode according to the present invention.
Figure 13:
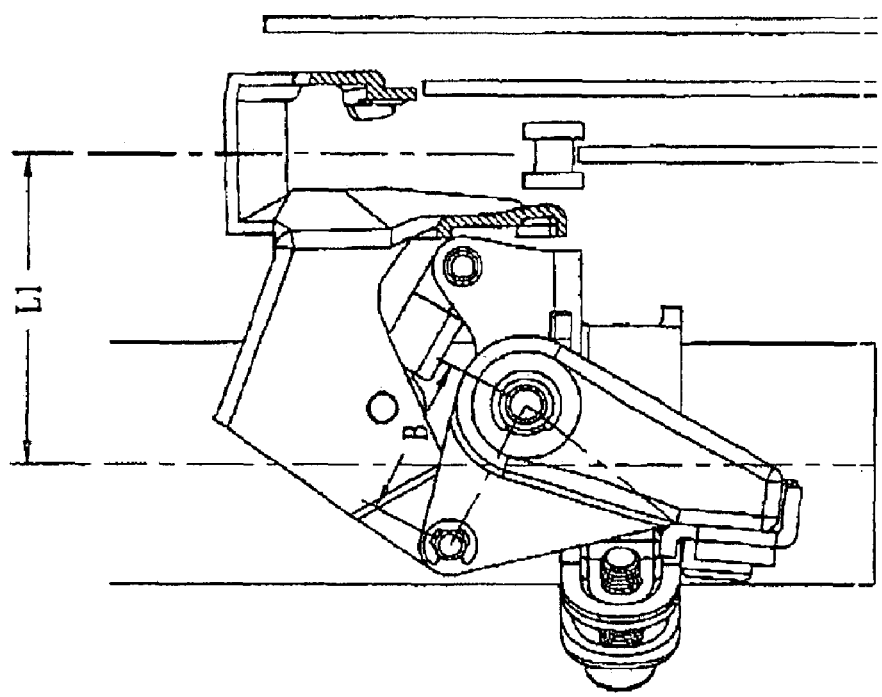

As seen in FIG. 13, by making L1=39 mm, L2 =53 mm (which is the same as the U.S. Pat. Nos. 5,496,222 and 5,620,384), and B=21 mm, thus $\phi_2$, is about equal to 41.81', that is

53−39=14

21*sin $\phi_2$=14

$\phi_2$=sin$^{-1}$(14/21)

If the length of B is 16 mm, then $\phi_2$ is about equal to 61.05'. If the length of B is 14 mm, then $\phi_2$ is about equal to 90'. Therefore, in actual practice, the length B shall be larger than L2−L1. In fact, the length of B is different in different manufacturer according to different specification.

Figure 14:
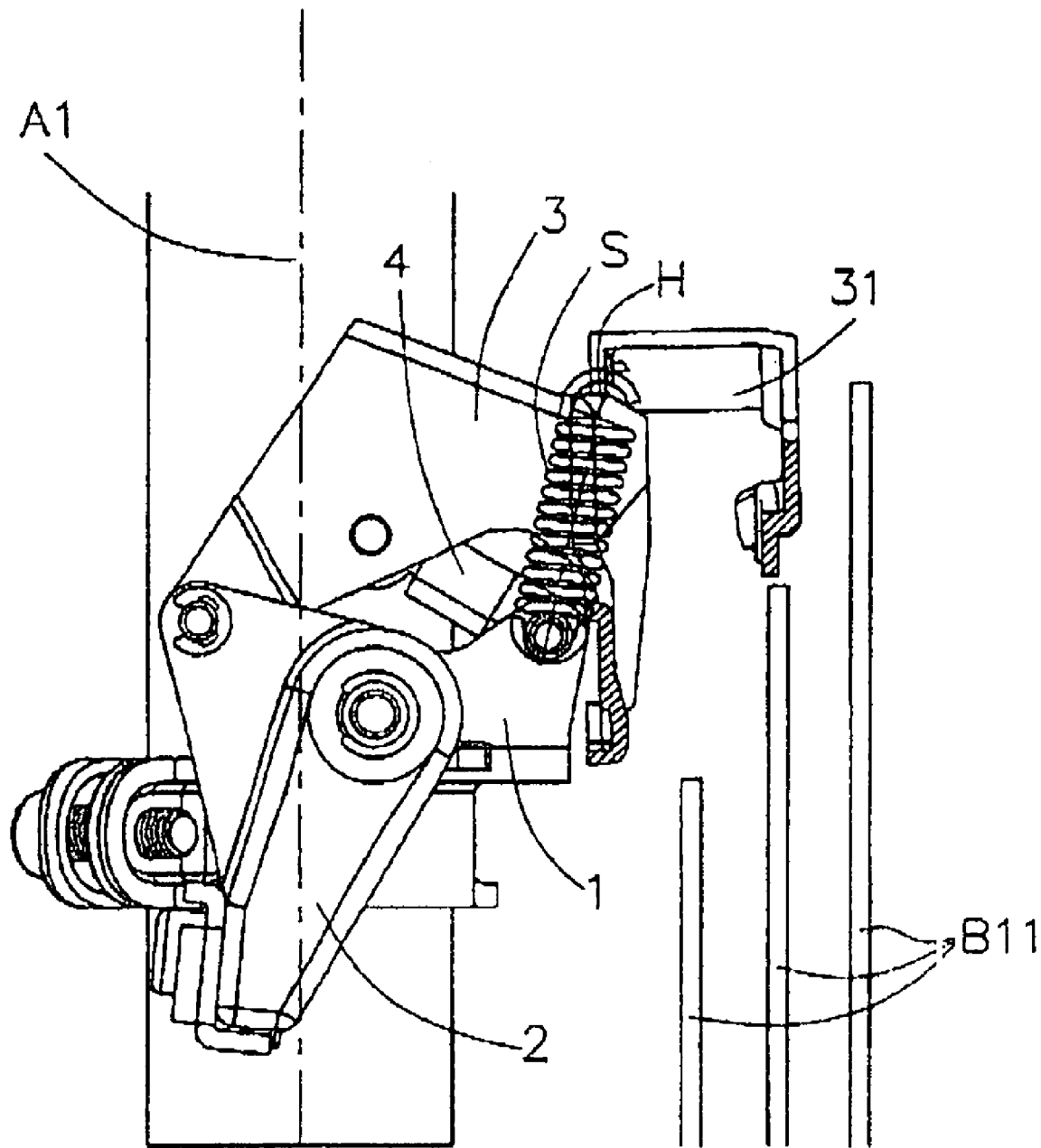
FIG. 14 is a front view drawing showing another embodiment of the present invention.
Figure 15:
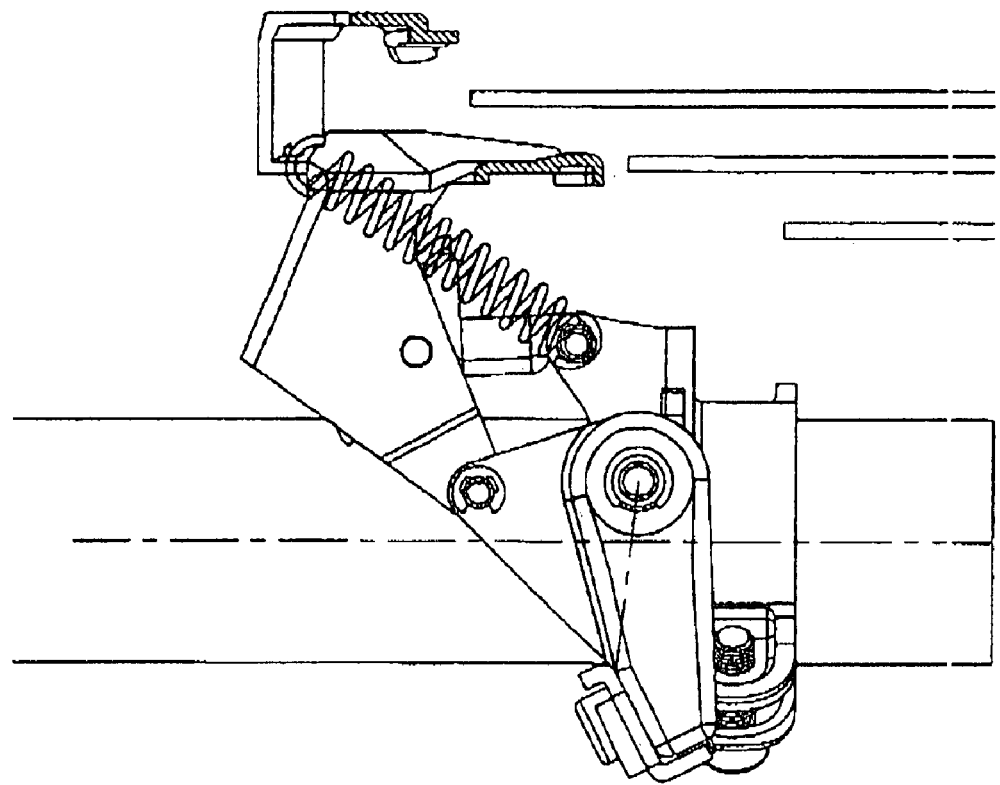
FIG. 15 is a schematic drawing showing the comparison of a working position of the chain guide between the high speed mode and the low speed mode according to another embodiment of the present invention.
Figure 15:
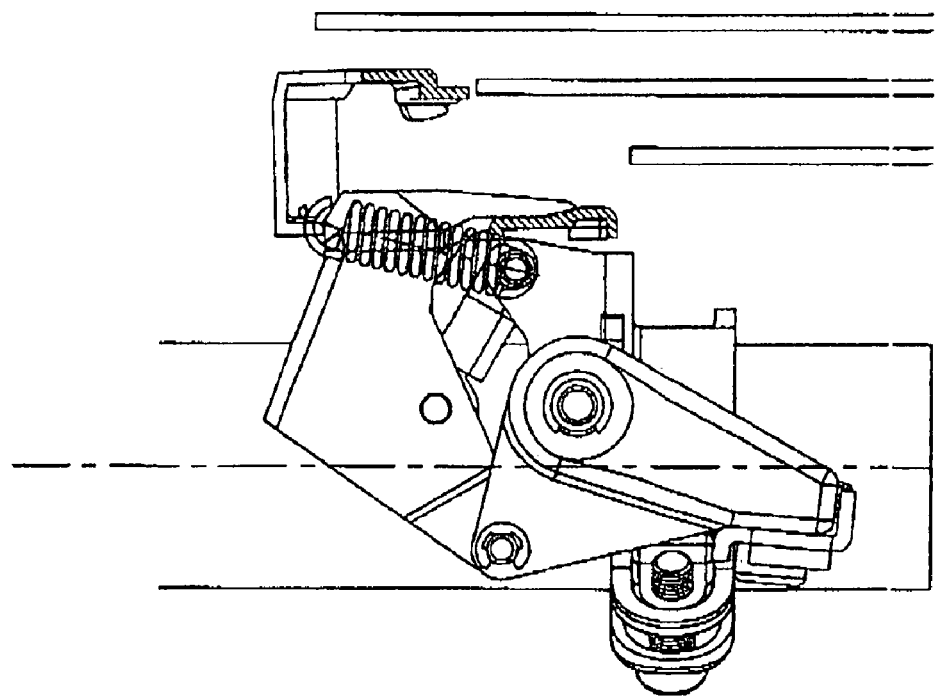

In another preferred embodiment, as shown in FIG. 14, an extension spring S having one end thereof connected to the lug 11 where connecting with the linkage rod 4, and the other end thereof connected to the chain guide 3 via a connecting hole H located at the upper inward side of the guide plate 31 instead of the return spring 52 installed on the shaft 51 of FIG. 7. In addition to the aforementioned advantages, this embodiment can provide the parallelogram linkage mechanism formed using the frame bracket 1, the actuating arm 2, the chain guide 3, and the linkage rod 4, which are the same as those of FIG. 6, with an restoring force of the extension spring S that can enhance the stability of the chain guide 3 by reducing the trembling caused by the manufacture clearance formed in and between the parallelogram linkage mechanism, as shown in FIG. 15.

The present invention provides a front derailleur for a bicycle, by which can fully utilize the restoring force of the return spring 52 during down-shifting in high speed mode, even when the linkage rod 4 is not exactly parallel to the seat tube A1, but with a ±10' difference caused by the use of difference constructing parts. The present invent can also enhance the up-shifting efficiency and improve the chain guide stability.

In summary that this invention has been disclosed and illustrated with reference to particular embodiments, the principles involved are susceptible for use in numerous other embodiments that will be apparent to persons skilled in the art. Consequently, the present invention has been examined to be progressive and has great potential in commercial applications.

Those skilled in the art should appreciate that they can readily use the disclosed conception and specific embodiments as a basis for designing or modifying other structures for carrying out the same purpose of the present invention, and that various changes, substitutions and alterations can be made herein without departing from the spirit and scope of the invention as defined by the append claims.

What is claimed is:

1. A front derailleur for a bicycle, the bicycle having a chain, a chain wheel, a control cable, and a seat tube, the front derailleur comprising:
    a) a frame bracket connected to the seat tube and located adjacent the chain wheel, the frame bracket having two lugs extending from a side thereof;
    b) a chain guide having:
        i) a guide plate over-striding the chain; and
        ii) a pivot joint located on a side of the chain guide opposite the guide plate;
    c) a linkage rod being pivotally connected to the two lugs at a first end thereof and pivotally connected to the pivot joint at a second end thereof; and
    d) an actuating arm pivotally connected to the frame bracket by a shaft having a return spring providing a restoring force, the actuating arm having:
        i) a cable connector, the control cable connected to the cable connector and selectively controlling a movement thereof; and
        ii) a pivot joint plate connected to the pivot joint,
    wherein a movement of the chain guide is controlled by the control cable to move the chain between at least a highest speed mode and a lowest speed mode, when the chain guide is in the highest speed mode, the linkage rod is located at a position substantially parallel with the seat tube and the restoring force of the return spring is equal to an active component force required for shifting the chain and the entire restoring force is utilized for down- shifting the chain from the highest gear to the middle gear.

2. The front derailleur according to claim 1, wherein the actuating arm having a first hole located on a middle section thereof, the frame bracket having a second hole located on a side of one of the two lugs, the shaft is connected at a first end to the first hole and at a second end to the second hole.

3. The front derailleur according to claim 1, wherein the cable connector includes a cover plate and a screw connecting the control cable thereto.

4. The front derailleur according to claim 1, when the linkage rod is between +10 degrees and −10 degrees of being parallel with the seat tube, the restoring force of the return spring is fully utilized during down-shifting from the highest speed mode.

5. A front derailleur for a bicycle, the bicycle having a chain, a chain wheel, a control cable, and a seat tube, the front derailleur comprising:
    a) a frame bracket connected to the seat tube and located adjacent the chain wheel, the frame bracket having two lugs extending from a side thereof;
    b) a chain guide having:
        i) a guide plate over-striding the chain; and
        ii) a pivot joint located on a side of the chain guide opposite the guide plate;
    c) a linkage rod being pivotally connected to the two lugs at a first end thereof and pivotally connected to the pivot joint at a second end thereof; and d) an actuating arm pivotally connected to the frame bracket by a shaft, the actuating arm having:
  i) a cable connector, the control cable connected to the cable connector and selectively controlling a movement thereof; and
  ii) a pivot joint plate connected to the pivot joint;
e) an extension spring providing a restoring force and connected to one of the two lugs at a first end and a connecting hole of the guide plate at a second end thereof, the connecting hole is located on an upper inward side of the guide plate,
wherein a movement of the chain guide is controlled by the control cable to move the chain between at least a highest speed mode and a lowest speed mode, when the chain guide is in the highest speed mode, the linkage rod is located at a position substantially parallel with the seat tube and the restoring force of the extension spring is equal to an active component force required for shifting the chain and the entire restoring force is utilized for down- shifting the chain from the highest gear to the middle gear.

6. The front derailleur according to claim 5, wherein the actuating arm having a first hole located on a middle section thereof, the frame bracket having a second hole located on a side of one of the two lugs, the shaft is connected at a first end to the first hole and at a second end to the second hole.

7. The front derailleur according to claim 5, wherein the cable connector includes a cover plate and a screw connecting the control cable thereto.

8. The front derailleur according to claim 5, when the linkage rod is between +10 degrees and −10 degrees of being parallel with the seat tube, the restoring force of the return spring is fully utilized during down-shifting from the highest speed mode.

* * * * *